United States Patent [19]
Hamasaki

[11] Patent Number: 5,708,533
[45] Date of Patent: Jan. 13, 1998

[54] ZOOM LENS BARREL

[75] Inventor: Takuji Hamasaki, Tokyo, Japan

[73] Assignee: Asahi Kogaku Kogyo Kabushiki Kaisha, Tokyo, Japan

[21] Appl. No.: 644,056

[22] Filed: May 10, 1996

[30] Foreign Application Priority Data

May 12, 1995 [JP] Japan .................. 7-114973

[51] Int. Cl.$^6$ .................. G02B 15/14
[52] U.S. Cl. .................. 359/700; 359/701
[58] Field of Search .................. 359/694, 695, 359/699, 700, 701, 703, 704

[56] References Cited

U.S. PATENT DOCUMENTS

| | | |
|---|---|---|
| 4,324,457 | 4/1982 | Tomori . |
| 4,387,968 | 6/1983 | Sekiguchi . |
| 4,523,815 | 6/1985 | Tomori . |
| 5,233,472 | 8/1993 | Haraguchi et al. . |
| 5,264,963 | 11/1993 | Ueyama .................. 359/695 |
| 5,446,593 | 8/1995 | Hamasaki et al. . |

FOREIGN PATENT DOCUMENTS 4-106511  4/1992  Japan .

*Primary Examiner*—David C. Nelms
*Assistant Examiner*—John P. Cornely
*Attorney, Agent, or Firm*—Greenblum & Bernstein P.L.C.

[57] ABSTRACT

A zoom lens barrel includes an annular stationary barrel having a guide groove. A lens drive ring is rotatably fitted onto an outer peripheral surface of the stationary barrel, and is provided with a cam groove on an inner peripheral surface thereof. A first lens moving ring, holding at least two lens groups which are spaced in the optical axis direction, is provided with a guide groove and a cam follower which extends through the guide groove of the stationary barrel to be engaged in the cam groove of the lens drive ring. The first lens moving ring is movable along the guide groove in accordance with a rotation of the lens drive ring. A second lens moving ring, having a cam groove on an inner peripheral surface thereof, is rotatably fitted onto an outer peripheral surface of the first lens moving ring so as not to move in the optical axis direction relative to the first lens moving ring. Provision is made for a lens supporting frame, provided in the first lens moving ring to move in the optical axis direction, which supports one lens group of a photographing lens system, and is provided with a cam follower which extends through the guide groove of the first lens moving ring to be slidably fitted in the cam groove of the second lens moving ring.

10 Claims, 5 Drawing Sheets

ZOOM LENS BARREL

BACKGROUND OF THE INVENTION

1. Field of the Invention

The present invention relates to a guide mechanism of a movable lens in a zoom lens barrel, and more precisely it relates to a guide mechanism of a lens group provided between a plurality of lens groups of which two lens groups are guided by the same lens moving frame to move in the optical axis direction.

2. Description of the Related Art

In general, a zoom lens barrel of a camera comprises two or more lens groups which move relatively in an optical axis direction along predetermined loci to vary a focal length. A lens moving mechanism, which moves the lens groups, is usually provided with linear movement guide grooves which are formed on a stationary lens barrel of the zoom lens barrel and extend in parallel to the optical axis, and a zooming drive ring which is rotatably fitted onto the stationary barrel and which is provided on an inner peripheral surface thereof with cam grooves corresponding to the above-mentioned loci. The lens groups are supported by lens moving frames, provided in the stationary lens barrel, which are provided with pins having rollers, which extend through the linear movement guide grooves of the stationary lens barrel and are engaged in the cam grooves of the zooming drive ring. Thus, when the zooming drive ring is rotated, the lens groups are moved in the optical axis direction along the predetermined loci.

In the conventional lens moving mechanism mentioned above, it is basically necessary to provide a plurality of lens moving frames and cam grooves, the number of which corresponds to the number of lens groups. If there are two or more lens groups which are moved while keeping a constant distance therebetween (i.e., along an identical locus), the lens groups can be supported by the same lens moving frame so as to move together in the optical axis direction, thus resulting in a simplification of the zoom lens barrel.

The simplification of the zoom lens barrel as mentioned above can be realized when two or more lens groups, moving together, are adjacent to each other. However, if there is another lens group (intermediate lens group) between the two (or more) lens groups, it is necessary to move the intermediate lens group in the optical axis direction along a locus different from the loci of the movement of the first mentioned two (or more) lens groups. To this end, in the prior art, it has been proposed that the lens frame which supports the intermediate lens group is split into two, i.e., inner and outer lens frame elements, located on the inner and outer sides of the lens moving frame which supports the two (or more) lens groups. The lens moving frame is provided with a through groove (opening) which extends therethrough from the inner side to the outer side. The inner and outer lens frame elements are connected by means of a connecting pin which extends through the opening.

However, this proposal increases the number of components and complicates the zoom lens barrel. Moreover, stray light tends to enter the intermediate lens group through the opening.

To solve this, two improvements have been proposed in Japanese Unexamined Patent Publication No. 4-106511, as shown in FIGS. 8 and 9. FIGS. 8 and 9 show longitudinal sectional views of an upper half of a zoom lens barrel, taken along an optical axis O. In FIGS. 8 and 9, the left and right sides correspond to the object and camera body sides, respectively.

In FIG. 8, the zoom lens is provided with three lens groups L11, L12 and L13, of which lens groups L11 and L13 are moved in the direction of the optical axis O while keeping a distance therebetween constant. Namely, the lens groups L11 and L13 are moved along an identical travel locus. The lens group L11 is held by an inner support frame 31a provided on a front end of a lens moving frame 31. The lens group L13 is held by a lens frame 32 which is in turn held by the lens moving frame 31 through a roller pin (pin having a roller attached) 33. The roller pin 33 is movable in an opening 31b formed at a rear end of the lens moving frame 31. Thus, the lens group L13 is held by the lens moving frame 31 so as to rotate about the optical axis O. The roller pin 33 is fitted at a front end thereof in a cam groove 34a formed in a stationary barrel 34.

The lens group L12 is secured to a lens frame 35 which is provided on an outer peripheral surface thereof with a roller pin 36 which is fitted in a linear movement guide groove 31c formed in the lens moving frame 31. The lens frame 35 is continuously pressed by a coil spring 39 toward the lens frame 32, so that the lens frame 35 abuts against an abutment surface (cam surface) 32a of the lens frame 32.

The lens moving frame 31 is provided on an outer peripheral surface of a front end thereof with a roller pin 37 which extends through a linear movement guide groove 34b formed in the stationary barrel 34 parallel to the optical axis O and is fitted in a cam groove 38a having a predetermined cam profile formed in a zooming drive ring 38.

When the zooming drive ring 38 is rotated about the optical axis O, the roller pin 37 is moved in the cam groove 38a, so that a movement of the lens moving frame 31 in the optical axis direction occurs. The axial movement of the lens moving frame 31 causes the lens groups L11 and L13 to move together in the optical axis direction without changing the axial distance therebetween. Since the roller pin 33 of the lens group L13 is fitted in the cam groove 34a of the stationary barrel 34, the lens group L13 rotates about the optical axis O. Consequently, the lens group L12, which is pressed against the cam surface 32a by the coil spring 39, is moved in the optical axis direction in accordance with a displacement of the cam surface 32a. Thus, the lens group L12 is moved in accordance with a predetermined locus, independent of the lens groups L11 and L13.

FIG. 9 shows another arrangement of a known zoom lens barrel. In FIG. 9, elements corresponding to those in FIG. 8 are designated with like reference numerals, and thus no duplicate explanation therefor will be given.

The lens frame 35, which supports the lens group L12, engages with the lens moving frame 31 through a lead screw (threaded portion) 40. A roller pin 41 of the lens frame 35 extends through an opening 31d of the lens moving frame 31 and is fitted in a cam groove 34c of the stationary barrel 34.

When a rotation of the zooming drive ring 38 about the optical axis O takes place, the lens groups L11 and L13 are moved together in the optical axis direction, as in the arrangement shown in FIG. 8. The lens group L12 is also moved in the optical axis direction in accordance with the movement of the lens moving frame 31 in the axial direction while rotating about the optical axis O in accordance with the lead of the lead screw 40, since the roller pin 41 is fitted in the cam groove 34c of the stationary barrel 34. Thus, the zooming operation is carried out.

In the arrangement shown in FIG. 8, since the lens frame 35 is pressed against the cam surface 32a by the coil spring 39, it is impossible to increase the displacement of the lens group L12. Moreover, when the lens group L13 rotates about the optical axis O, the axis of the lens group L13 may be deviated from the optical axis O or the lens surface of the lens group L13 may be inclined with respect to the optical axis O. In addition to the foregoing, the employment of rollers or pins complicates the assembling operation and increases the length of the overlap between the lens frame 35 and the lens moving frame 31.

In the arrangement shown in FIG. 9, the lens moving frame 31 must be provided with the opening 31d through which the pin 41 extends. The employment of the roller or pin and the assembling holes therefor complicates assembling operation. In addition, a deviation of the axis of the lens group L12 or an inclination of the lens surface thereof may occur during rotation. Moreover, there is a possibility that stray light enters the lens group L12 through the linear movement guide groove or the cam grooves (through openings) present in the vicinity of the lens group L12.

SUMMARY OF THE INVENTION

It is an object of the present invention to provide a simple and small lens moving mechanism in a zoom lens barrel in which an intermediate lens group, provided between two lens groups, is moved during the zooming operation without rotating any lens groups.

Another object of the present invention is to provide a lens moving mechanism in which no stray light enters an intermediate lens group provided between two lens groups.

According to an aspect of the present invention, there is provided a lens barrel having an annular stationary barrel. A lens drive ring is rotatably fitted onto an outer peripheral surface of the stationary barrel. A first lens moving ring, holding at least two lens groups spaced in an optical axis direction, is movable along the optical axis in accordance with a rotation of the lens drive ring. A second lens moving ring is rotatably fitted onto an outer peripheral surface of the first lens moving ring so as not to move in the optical axis direction relative to the first lens moving ring, when the lens drive ring is rotated. A lens supporting frame is provided in the first lens moving ring and supports a lens group of a photographing lens system, between the at least two lens groups. The lens supporting frame is movable along the optical axis in accordance with a rotation of the second lens moving ring.

According to another aspect of the present invention, a lens barrel is provided having an annular stationary barrel having a guide groove formed thereon. A lens drive ring is rotatably fitted onto an outer peripheral surface of the stationary barrel. A cam groove is provided on an inner peripheral surface of the lens drive ring. A first lens moving ring, adapted to hold at least two lens groups which are spaced in an optical axis direction, is provided to be movable along the guide groove in accordance with a rotation of the lens drive ring. A guide groove and a cam follower are provided on the first lens moving ring. The cam follower extends through the guide groove of the stationary barrel to be engaged in the cam groove of the lens drive ring. A second lens moving ring, provided on an inner peripheral surface thereof with a cam groove, is rotatably fitted onto an outer peripheral surface of the first lens moving ring so as not to move in the optical axis direction relative to the first lens moving ring. A lens supporting frame, which supports a lens group of a photographing lens system, is provided in the first lens moving ring to move in the optical axis direction. The lens supporting frame is provided with a cam follower which extends through the guide groove of the first lens moving ring and is slidably fitted in the cam groove of the second lens moving ring.

Preferably, the second lens moving ring covers at least the guide groove of the first lens moving ring.

According to a further aspect of the present invention a zoom lens barrel is provided having an annular stationary barrel. The stationary barrel is provided with a linear movement guide groove extending in parallel with an optical axis of a photographing lens system. A zooming drive ring, rotatably fitted onto an outer peripheral surface of the stationary barrel, is provided with a cam groove on an inner peripheral surface thereof. A first lens moving ring, being adapted to hold at least two lens groups which are spaced in a direction of the optical axis, is movable along the linear guide groove in accordance with a rotation of the zooming drive ring. The first lens moving ring is provided with a linear movement guide groove and a projection which extends through the linear movement guide groove of the stationary barrel to be engaged in the cam groove of the lens drive ring. A second lens moving ring, having a cam groove on an inner peripheral surface thereof, is rotatably fitted onto an outer peripheral surface of the first lens moving ring so as not to move in the optical axis direction relative to the first lens moving ring. A lens supporting frame, supporting one lens group of a photographing lens system, is provided in the first lens moving ring to move in the optical axis direction. A projection, provided on the lens supporting frame, extends through the linear movement guide groove of the first lens moving ring to be slidably fitted in the cam groove of the second lens moving ring.

The present disclosure relates to subject matter contained in Japanese patent application No. 07-114973 (filed on May 12, 1995) which is expressly incorporated herein by reference in its entireties.

BRIEF DESCRIPTION OF THE DRAWINGS

The invention will be described below in detail with reference to the accompanying drawings, in which like reference numerals indicate similar parts, and wherein.

DESCRIPTION OF THE PREFERRED EMBODIMENT

Figure 1:
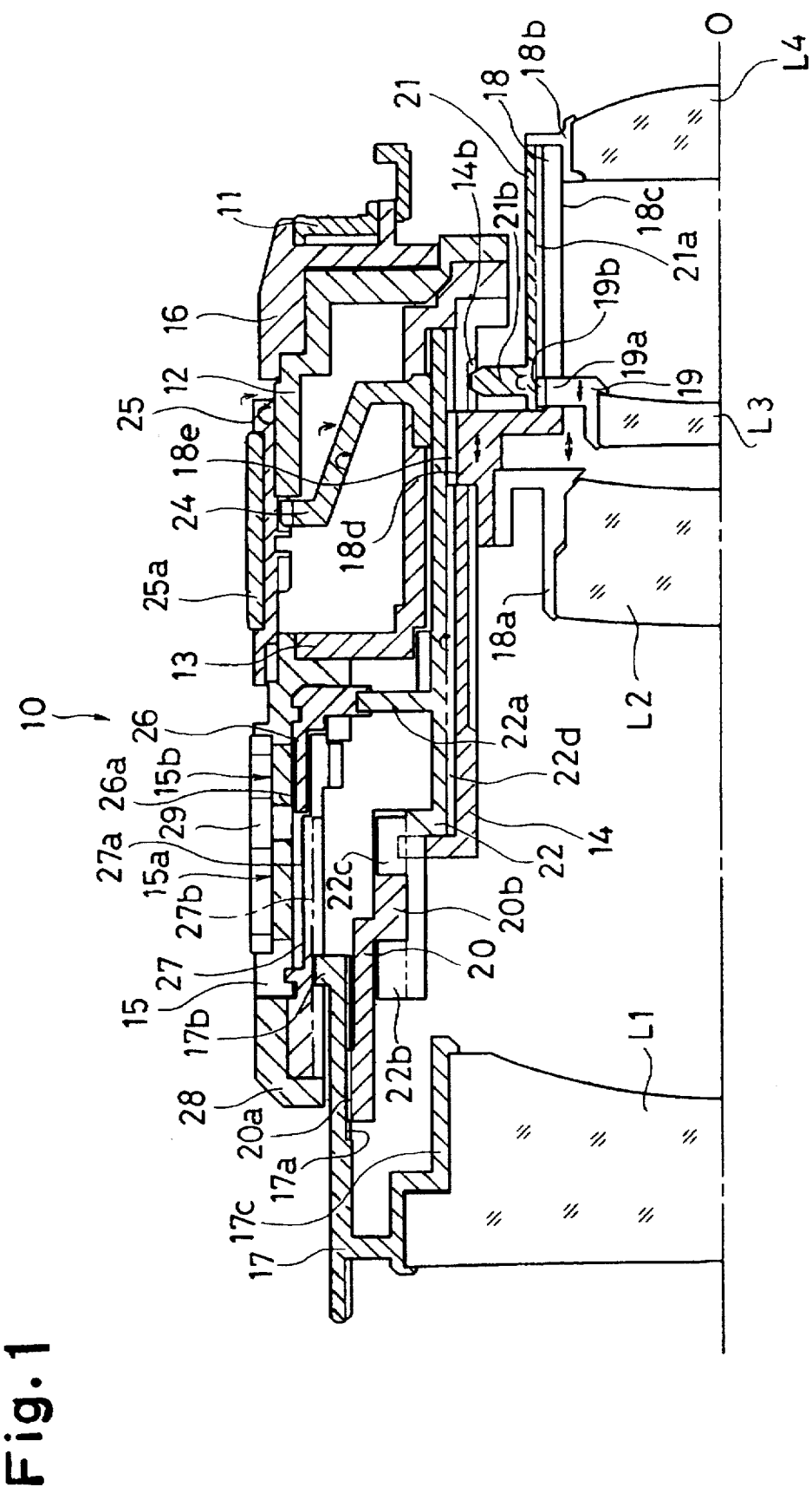
FIG. 1 is a sectional view of an upper half of a zoom lens barrel, taken along an optical axis, according to an embodiment of the present invention.

FIG. 1 shows a sectional view of an upper half of a zoom lens barrel 10, according to an aspect of the present invention. The zoom lens barrel 10 is provided with four lens groups, i.e., first, second, third, and fourth lens groups L1, L2, L3 and L4, respectively, which constitute a photographing lens system. The zoom lens barrel 10 is provided at one end thereof with a lens mount 11 which can be detachably attached to a camera body (not shown). The lens mount 11 is secured to a mount connecting ring 12 which is in turn secured to a housing 13. A stationary barrel 14 and an outer stationary barrel 15 are respectively secured to an inside and a front end of the housing 13. A rotatable diaphragm ring 16 is provided between the lens mount 11 and the mount connecting ring 12.

A zooming drive ring (lens drive ring) 22 is rotatably fitted onto an outer peripheral surface of the stationary barrel 14. The zooming drive ring 22 is provided at a front end thereof with a helicoid ring 20 which is guided by the stationary barrel 14 to linearly move in the axial direction through a cam mechanism (not shown) provided between the zooming drive ring 22 and the helicoid ring 20. The helicoid ring 20 is provided at a front end thereof with a decoration frame 17 connected thereto. Namely, the helicoid ring 20 and the decoration frame 17 are screw-engaged through a helicoid 20a, formed on an outer peripheral surface of the helicoid ring 20, and a helicoid 17a, formed on an inner peripheral surface of the decoration frame 17.

A focusing ring 28 is connected to a front end of the outer stationary barrel 15 so as to rotate about an optical axis O, without moving in the optical axis direction. A distance scale ring 27 is fitted in the outer stationary barrel 15 and the focusing ring 28 to rotate together with the focusing ring 28. The distance scale ring 27 is provided on an inner peripheral surface thereof with a lead groove 27b in which an outer projection 17b, formed at a rear end of the decoration ring 17, is slidably fitted. Consequently, when the focusing ring 28 rotates, the distance scale ring 27 is rotated together therewith, and the decoration frame 17 is rotated together with the focusing ring 28 while being free to move in the optical axis direction. Namely, the decoration frame 17 is moved in the optical axis direction through the engagement of the helicoids 17a and 20a while rotating. Focus adjustment is carried out by the axial movement of the decoration frame 17.

The first lens group L1 is held by a lens support frame 17c which projects from an inner peripheral surface of a front end of the decoration frame 17. The second and fourth lens groups L2, L4 are respectively held by a second lens frame 18a and a fourth lens frame 18b. The second and fourth lens frames 18a, 18b are secured to a first lens moving ring 18.

Figure 2:
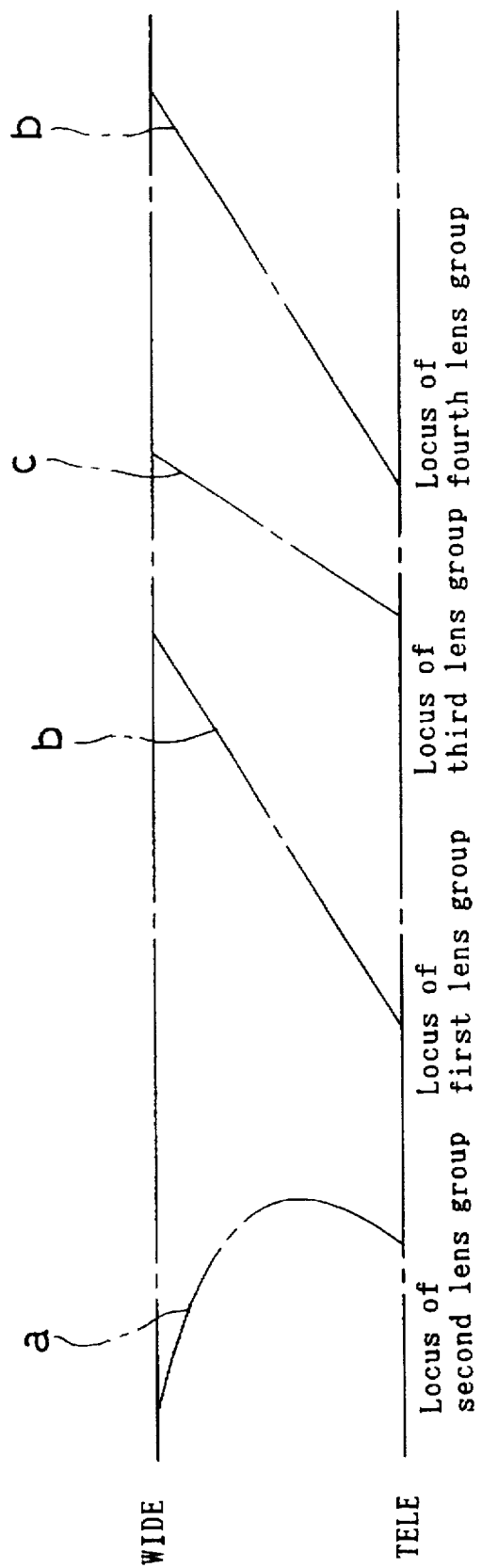
FIG. 2 is a diagram of loci along which lens groups are moved.
Figures 3, 4:
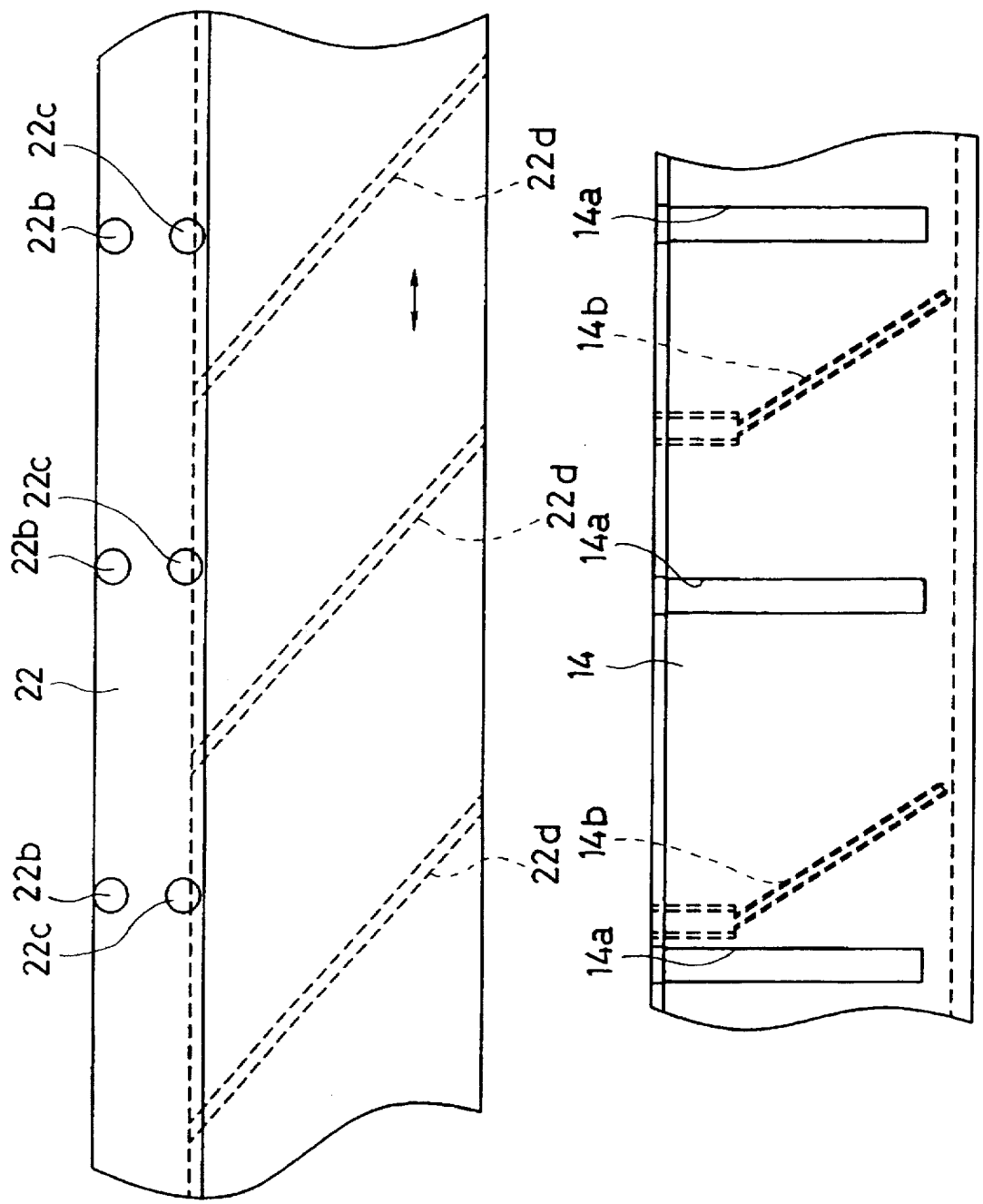
FIG. 3 is a developed view of a zooming drive ring.
FIG. 4 is a developed view of a stationary barrel.

The first lens moving ring 18 has arms 18d protecting from an outer peripheral surface thereof. The arms 18d extend through linear movement guide grooves 14a (FIG. 4) formed in the stationary barrel 14. The arms 18d are provided at a front end surface with oblique ribs (cam followers) 18e projecting therefrom. The zooming drive ring 22 is provided, on an inner peripheral surface of a small diameter portion thereof, with three lead grooves (cam grooves) 22d which are spaced at an equi-angular distance, so that the oblique ribs 18e are slidably fitted in the lead grooves 22d (FIG. 3). The profile of the lead grooves 22d corresponds to the locus ("b" in FIG. 2) along which the second and fourth lens groups L2 and L4 are moved.

Figure 6:
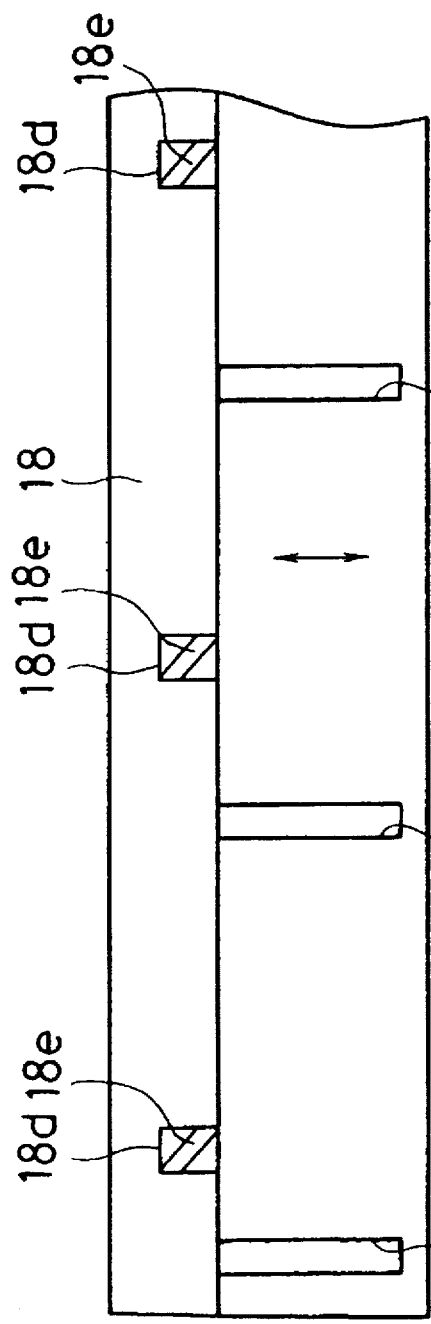
FIG. 6 is a developed view of a first lens moving ring.
Figure 5:
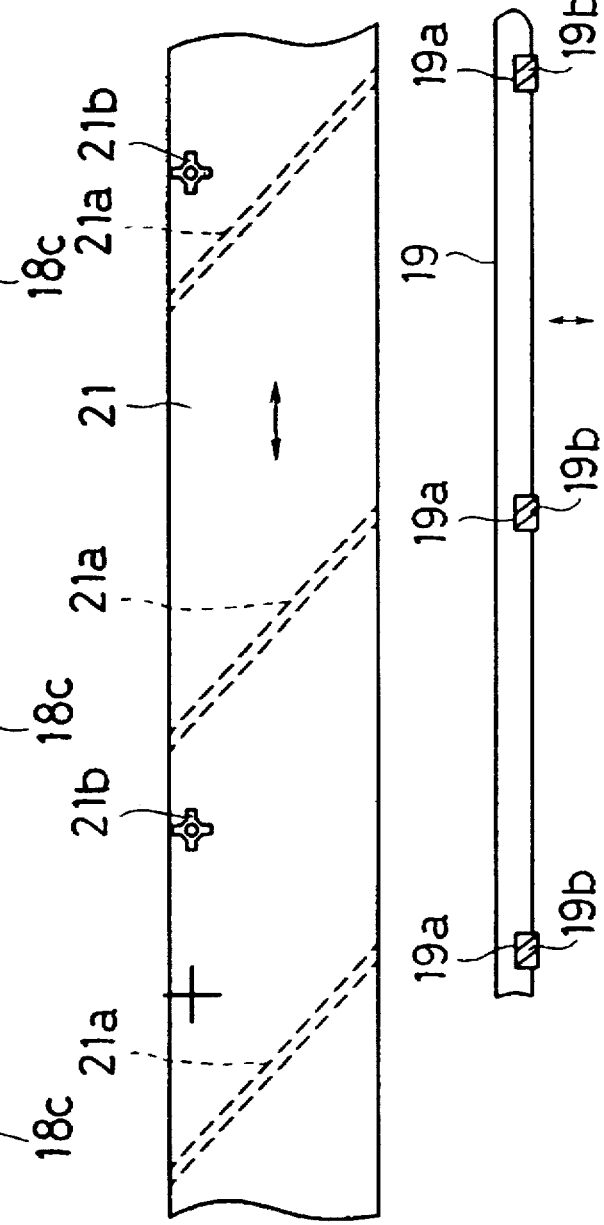
FIG. 5 is a developed view of a second lens moving ring.
Figure 7:
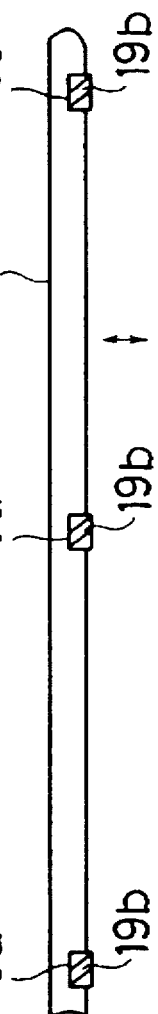
FIG. 7 is a developed view of a third lens group support frame.
Figure 8:
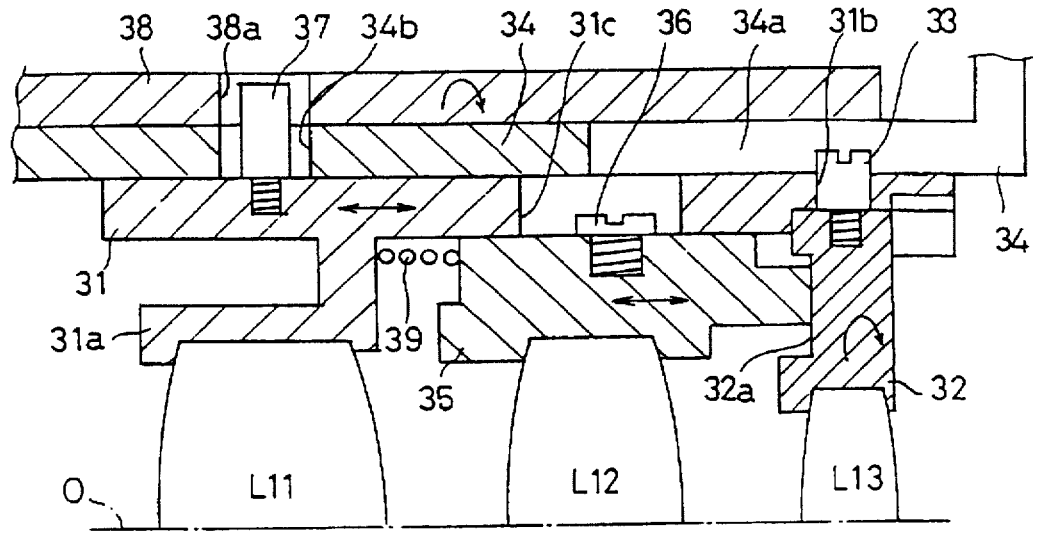
FIG. 8 is a sectional view of an upper half of main components of a known lens moving mechanism, taken along an optical axis; and, FIG. 9 is a view similar to FIG. 8, showing another known lens moving mechanism.
Figure 9:
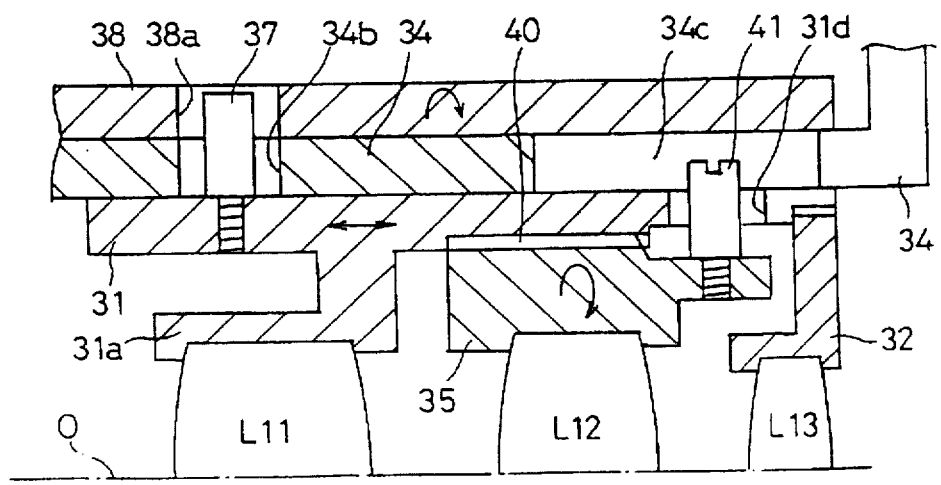

The third lens group L3 is held by a third lens group supporting frame 19 which is connected to and supported by the first lens moving ring 18 and a second lens moving ring 21, which is rotatably fitted onto an outer peripheral surface of the first lens moving ring 18. The third lens group supporting frame 19 is provided on an outer peripheral surface thereof with three projecting arms 19a which are spaced at an equi-angular distance in the circumferential direction, as shown in FIG. 7. The arms 19a extend through linear movement guide grooves 18c (FIG. 6) of the first lens moving ring 18. Oblique ribs 19b, provided at the front ends of the arms 19a, are slidably fitted in three cam grooves 21a (FIG. 5) formed on an inner peripheral surface of the second lens moving ring 21. The linear movement guide grooves 18c extend in parallel to the optical axis O.

The stationary barrel 14 is provided, on an inner peripheral surface thereof, with a cam groove 14b in which a front end of a projection 21b, formed on the outer peripheral surface of the second lens moving ring 21, is fitted. The cam groove 14b corresponds to the locus ("c" in FIG. 2) along which the third lens group L3 is moved.

The zooming drive ring 22, fitted on the stationary barrel 14, is provided on an outer peripheral surface thereof with a pin 22a which is fitted in a focal length scale ring 26.

The zooming drive ring 22 has a large diameter portion on a front end side thereof (i.e., close to the first lens group L1), which is provided on a front end thereof with a pair of guide projections 22b and 22c (FIG. 3). A convex portion 20b, inwardly protruding from a rear end of the helicoid ring 20, is slidably fitted in a space defined between the guide projections 22b and 22c. The side surface of the convex portion 20b is shaped such that a resultant lead of the helicoids 17a and 20a corresponds to the locus ("a" in FIG. 2) along which the first lens group L1 is moved.

A zoom operation ring 25 is rotatably fitted on the mount connecting ring 12 and the outer stationary barrel 15. An anti-slip rubber ring 25a is fitted on the zoom operation ring 25. The zoom operation ring 25 is associated with a zoom lever 24 secured to the zooming drive ring 22 by a clutch mechanism (not shown) which engages and disengages when the zoom operation ring 25 is moved backward (toward the lens mount 11) and forward (toward the first lens group L1), respectively.

The focal length scale ring 26 which bears a scale printed thereon representing the focal length, is rotatably fitted in the outer stationary barrel 15. The pin 22a engages at a front end thereof with an inner surface of the focal length scale ring 26. When a rotation of the zooming drive ring 22 occurs, the rotation is transmitted to the focal length scale ring 26 through the pin 22a, so that the zooming drive ring 22 and the focal length scale ring 26 are rotated together.

The outer stationary barrel 15 is provided with openings (indication windows 15a and 15b) respectively corresponding to the distance scale ring 27 and the focal length scale ring 26. The indication windows 15a and 15b are closed by a single transparent cover 29. Consequently, a photographer can view a distance scale 27a and a focal length scale 26a through the indication windows 15a and 15b, respectively.

A zooming operation will be discussed below.

When zooming is carried out manually by a photographer, the zoom operation ring 25 is moved toward the lens mount 11. As a result, the zoom operation ring 25 engages with the zoom lever 24. In this state, when the zoom operation ring 25 is rotated in a clockwise or counterclockwise direction, the zooming drive ring 22 is rotated in the same direction through the zoom lever 24. Consequently, the first, second, fourth and third lens groups L1, L2, L4 and L3 are relatively moved away from or close to each other to perform telephoto zooming or wide-angle zooming.

When the zooming drive ring 22 is rotated about the optical axis O, the helicoid ring 20 is moved in accordance with the profile (shape) of the convex portion 20b held between the projections 22b and 22c. Since the projection 17b is engaged by the lead groove 27b, the decoration frame 17 is moved together with the helicoid ring 20 along the lead groove 27b. Namely, the first lens group L1 is moved in the optical axis direction O without rotating.

The second and fourth lens groups L2 and L4 are moved in the optical axis direction O without rotating, since the arms 18d are engaged in the linear guide grooves 14a and the oblique ribs 18e are engaged in the lead grooves 22d of the zooming drive ring 22.

The third lens group L3 is moved in the optical axis direction similar to the first lens moving ring 18 (second and fourth lens groups L2 and L4), relative to the first lens moving ring 18 while the arms 19a are engaged in the linear movement guide grooves 18c and the oblique ribs 19b are engaged in the cam grooves 21a.

When the first lens moving ring 18 is moved in the optical axis direction, the second lens moving ring 21 is not only moved together therewith in the optical axis direction, but also rotates about the optical axis O since the projection 21b is engaged in the cam groove 14b. When the second lens moving ring 21 is moved in the optical axis direction while rotating, the third lens group supporting frame 19 is moved in the optical axis direction without rotating since the arms 19a extend through the linear movement guide grooves 18c of the first lens moving ring 18, so that the oblique ribs 19b are engaged in the cam grooves 21a of the second lens moving ring 21. The direction of the axial movement of the third lens group supporting frame 19 is determined in accordance with the rotation of the second lens moving ring 21. Namely, the third lens group L3 is relatively moved away from or close to the second and fourth lens groups L2 and L4.

Upon power zooming, the zoom operation ring 25 is advanced toward the object to be photographed. Consequently, the zoom operation ring 25 is disengaged from the zoom lever 24, so that the operation mode is switched from the manual mode to the power mode. In this state, when the zoom operation ring 25 is rotated in the clockwise or counterclockwise direction, a telephoto switch or wide angle switch (not shown) is turned ON, so that a zoom motor (not shown) is driven to rotate the zooming drive ring 22 to effect the power zooming operation.

In the zoom lens mentioned above, the stationary barrel 14, the third lens group supporting frame 19, the first lens moving ring 18, the second lens moving ring 21, and the zooming drive ring 22, etc., can be made of a plastic mold, integrally with the respective arms, projections, linear movement guide grooves, and cam grooves, etc. Hence, the structure can be remarkably simplified in comparison with the prior art in which the separate roller pins are attached.

Moreover, since the first lens moving ring 18 is surrounded (covered) by the second lens moving ring 21 having no groove, no stray light enters the optical path defined between the second lens group L2 and the fourth lens group L4, i.e., in the vicinity of the third lens group L3.

As can be understood from the above discussion, according to the present invention, during a zooming operation in which at least two lens groups are moved together in the optical axis direction, an intermediate lens group, provided between the lens groups, can be moved without rotating, by a simple mechanism. Consequently, neither the optical axis of the intermediate lens group deviates, nor an inclination of the lens surface thereof occurs, during the zooming operation.

Furthermore, if the projections and the cam grooves, etc., are integrally plastic molded, it is not necessary to provide pins or rollers, thus resulting in a simple zoom lens barrel.

What is claimed is:

1. A lens barrel, comprising:

an annular stationary barrel having a guide groove formed thereon;

a lens drive ring rotatably fitted onto an outer peripheral surface of said stationary barrel, said lens drive ring being provided with a cam groove on an inner peripheral surface thereof;

a first lens moving ring being adapted to hold at least two lens groups which are spaced in an optical axis direction, said first lens moving ring being movable along said guide groove in accordance with a rotation of said lens drive ring, said first lens moving ring being provided with a guide groove thereon;

a cam follower provided on said first lens moving ring, said cam follower extending through said guide groove of said stationary barrel to be engaged in said cam groove of said lens drive ring;

a second lens moving ring which is provided on an inner peripheral surface thereof with a cam groove, said second lens moving ring being rotatably fitted onto an outer peripheral surface of said first lens moving ring so as not to move in said optical axis direction relative to said first lens moving ring; and a lens supporting frame which supports a lens group of a photographing lens system, said lens supporting frame being provided in said first lens moving ring to move in said optical axis direction, wherein said lens supporting frame is provided with a cam follower which extends through said guide groove of said first lens moving ring and is slidably fitted in said cam groove of said second lens moving ring.

2. The lens barrel according to claim 1, wherein said second lens moving ring covers at least said guide groove of said first lens moving ring.

3. The lens barrel according to claim 1, wherein said stationary barrel is provided on an inner peripheral surface thereof with a cam groove, and wherein said second lens moving ring is provided with a projection which is slidably fitted in said cam groove of said stationary barrel.

4. The lens barrel according to claim 3, wherein said second lens moving ring and said projection are integrally made of molded plastic.

5. The lens barrel according to claim 1, wherein said lens supporting frame and said cam follower are integrally made of molded plastic.

6. The lens barrel according to claim 1, wherein said guide groove of said first lens moving ring is a linear groove which extends in parallel with said optical axis of said photographing lens system.

7. The lens barrel according to claim 3, wherein said cam groove, formed on said inner peripheral surface of said stationary barrel, is a lead groove having a constant lead.

8. The lens barrel according to claim 1, wherein said cam follower of said first lens moving ring comprises an oblique rib which extends through said guide groove of said stationary barrel to be engaged in said cam groove of said lens drive ring.

9. The lens barrel according to claim 1, wherein said photographing lens system comprises a zoom lens having a lens group which is moved in association with said rotation of said lens supporting frame, in front of said at least two lens groups.

10. A zoom lens barrel, comprising:

an annular stationary barrel having a linear movement guide groove extending in parallel with an optical axis of a photographing lens system;

a zooming drive ring which is rotatably fitted onto an outer peripheral surface of said stationary barrel, said zooming drive ring being provided on an inner peripheral surface thereof with a cam groove;

a first lens moving ring being adapted to hold at least two lens groups which are spaced in a direction of said optical axis, said first lens moving ring being movable along said linear guide groove in accordance with a rotation of said zooming drive ring, said first lens moving ring being provided with a linear movement guide groove;

a projection provided on said first lens moving ring, said projection extending through said linear movement guide groove of said stationary barrel to be engaged in said cam groove of said lens drive ring;

a second lens moving ring which is provided on an inner peripheral surface thereof with a cam groove, said second lens moving ring being rotatably fitted onto an outer peripheral surface of said first lens moving ring so as not to move in said optical axis direction relative to said first lens moving ring;

a lens supporting frame which supports one lens group of a photographing lens system, said lens supporting frame being provided in said first lens moving ring to move in said optical axis direction; and a projection provided on said lens supporting frame, said projection extending through said linear movement guide groove of said first lens moving ring to be slidably fitted in said cam groove of said second lens moving ring.

* * * * *